June 7, 1932.  R. C. GALLINANT  1,861,958
AUTOMATIC STOP AND COMPENSATING STRUT FOR HAND PROPELLED VEHICLES
Filed Aug. 27, 1930  2 Sheets-Sheet 1
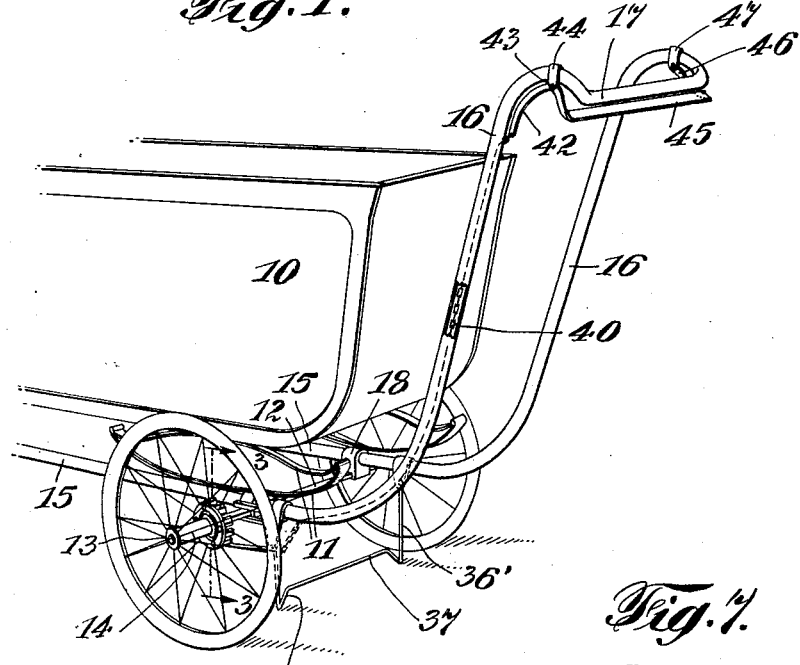
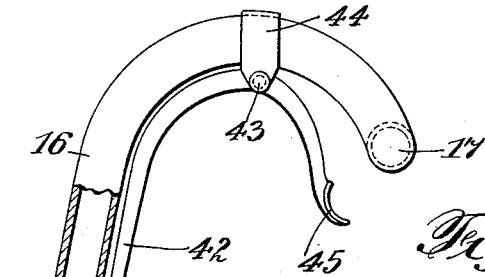
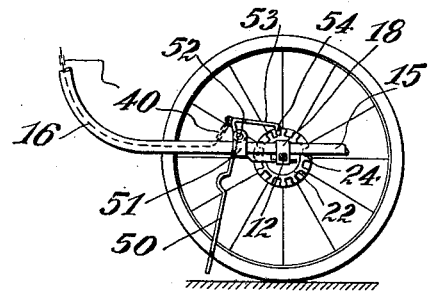
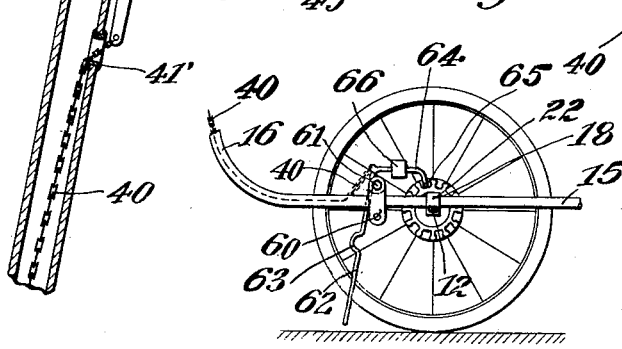
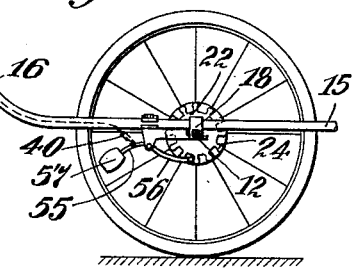
INVENTOR
Raphael C. Gallinant
BY
Willis and Hastings
ATTORNEYS June 7, 1932. R. C. GALLINANT 1,861,958
AUTOMATIC STOP AND COMPENSATING STRUT FOR HAND PROPELLED VEHICLES
Filed Aug. 27, 1930 2 Sheets-Sheet 2
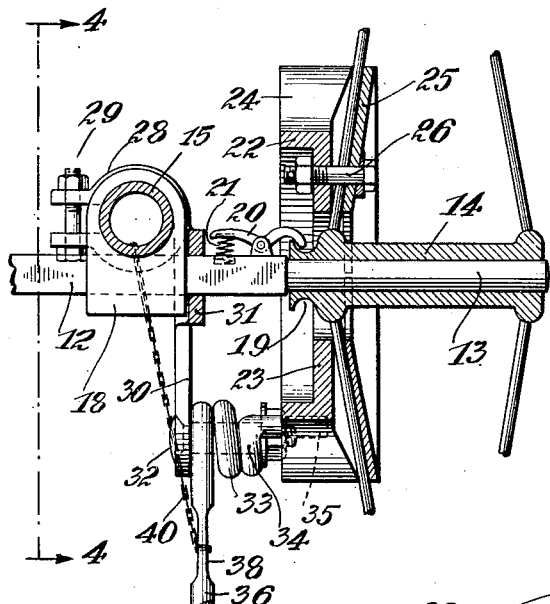
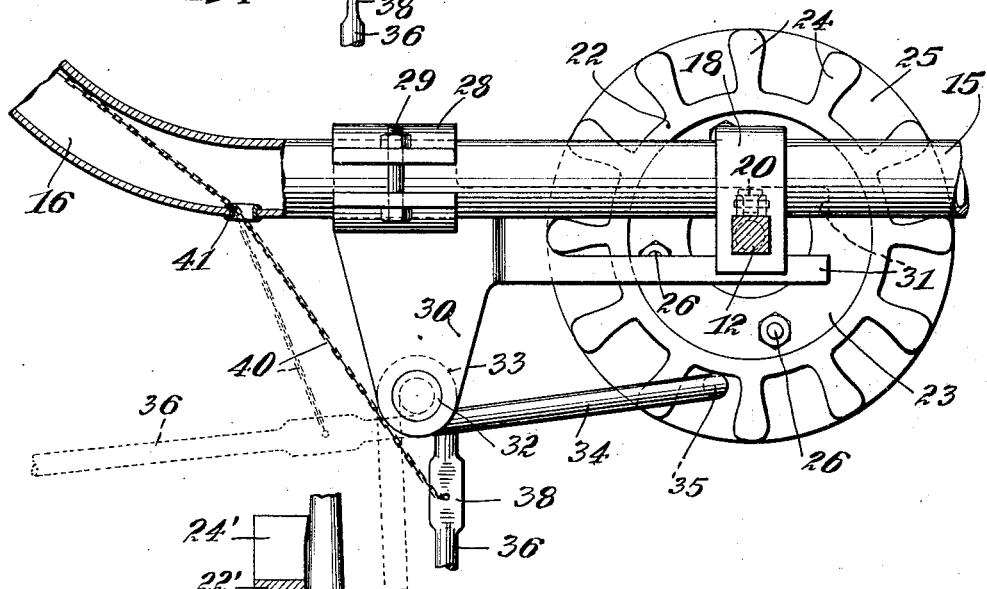
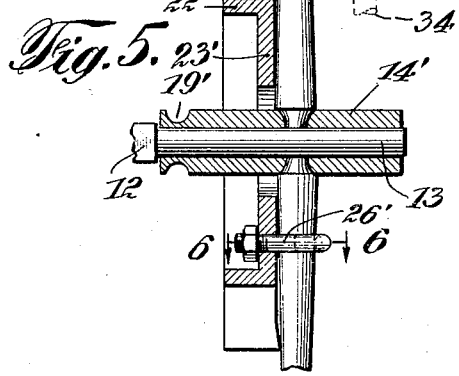
INVENTOR
Raphael C. Gallinant.
BY
ATTORNEYS Patented June 7, 1932

1,861,958

UNITED STATES PATENT OFFICE

RAPHAEL C. GALLINANT, OF RIDGEFIELD PARK, NEW JERSEY

AUTOMATIC STOP AND COMPENSATING STRUT FOR HAND PROPELLED VEHICLES

Application filed August 27, 1930. Serial No. 478,077.

This invention relates to improvements in safety devices for hand propelled vehicles with special reference to baby coaches, children's carriages, perambulators and the like, adapted to be propelled by pressure exerted on a handle bar at the rear.

In ordinary carriages of the foregoing type many serious accidents have occurred by reason of the vehicle moving by gravity down an inclined surface, or by the effect of a strong wind when left unattended, even momentarily, unless supplied with brakes.

The usual type of brakes on such vehicles are prone to slip, are easily displaced and are subject to the mischievous touch of thoughtless persons who may unintentionally release the vehicle to the danger of its innocent occupant.

Another source of danger, inherent to ordinary children's carriages, is in the ease with which they are overbalanced and tip backward when the occupants assume a position at the rear of the vehicle, beyond the center of gravity of the rear wheels.

With these matters in mind, it is an object of the present invention to provide a positive lock for the rear wheels, which automatically becomes effective the instant that the hands are removed from the handle bar, and without any mental or physical effort on part of the attendant.

A further feature is in the provision of means which effectually prevent the carriage from tilting backward, by reason of applying a strut extending downward to the ground level, coincidently with the setting of the lock.

Other advantageous features reside in the production of a safety device applicable to presently existing vehicles or at the time of their manufacture; that in no manner prevent the removal of the wheels for oiling, etc., in the simplicity and directness of application, cheapness of production and total avoidance of springs.

These several objects, and others which will appear as the description proceeds, are accomplished by the novel construction, combination and arrangement of parts hereinafter described and illustrated in the accompanying drawings, constituting a material part of this disclosure, and in which:—

Figure 1 is a perspective view of part of a conventional type of a child's carriage, illustrating the application of the invention.

Figure 2 is an enlarged fragmentary side view of the handle bar and supports.

Figure 3 is a sectional view taken on line 3—3 of Figure 1, showing an application of the device to a vehicle having wire spoke wheels, and drawn to an enlarged scale.

Figure 4 is a sectional view taken on line 4—4 of Figure 3.

Figure 5 is a similar view to Figure 3 but showing a wooden spoke wheel.

Figure 6 is a sectional view taken on line 6—6 of Figure 5.

Figure 7 is a side elevational view of a modified form of the device in which the parts are reversed in position from that shown in Figure 1.

Figure 8 is a side view of the device with a counterweight substituted for the strut.

Figure 9 is a similar side elevational view of a further modification in construction.

In Figure 1 will be recognized a common type of baby carriage, composed of a body 10 supported on pairs of semi-elliptic springs 11 fixed on axles 12, usually of square cross section, having cylindrical pintles 13 at their ends, on which are mounted the hubs 14—14' of wheels, either having wire spokes as shown in Figures 1, 3 and 4, or wooden spokes, as seen in Figure 5.

Also secured on the axles are a pair of side bars or perches 15, which may or may not be a part of the handle bar supports or reaches 16, carrying at their outwardly inclined, raised rear ends, a push handle bar 17, these side bars being rigidly fixed to the axle by connecting brackets 18.

The upper portions of these bars are ordinarily curved gracefully downward presenting a pleasing appearance and their main portions are commonly tubular as shown.

In order to ship these vehicles in bulk, and further, for applying lubrication, the hubs 14—14' are formed with an annular recess 19—19' in their inner end portions, the same to receive the detent ends of clip levers 20, see Figure 3, mounted on the adjacent portions of the axles and normally held in engaging position by compression springs 21.

All of the foregoing elements are old and well known, constituting no part of the present invention, being recited merely that a proper understanding of the safety device may be had.

In the wire spoked type of wheel, a keeper sprocket 22 is attached to the inner side of one of the rear wheels, the sprocket having an opening in its web 23 to pass freely over the hub of the wheel, and is provided with a plurality of elongated peripheral teeth 24, the sprocket being bound to the wire wheel by a split plate washer 25 on the inner side of the spokes and clamped by bolts 26 passing through the web and washer.

In Figure 5 a similar sprocket 22' is provided with a web 23', teeth 24', and is held to the wooden spokes of the wheel by hook bolts 26', no washer being required.

Held adjustably on one of the side bars 15 is a clamp 28 provided with a bolt 29, and depending from the clamp is a support bracket 30, from which extend a pair of offset forked arms 31 adapted to engage the top and bottom surfaces of the axle 12.

Mounted in the lower end of the bracket 30 is a stud bolt 32, the same extending outwardly, and freely rotatable on the body of said stud bolt is a lever composed of one or more coils 33 of a wire rod, its outer coil being extended toward the sprocket, as an arm 34, terminating in an inbent stop detent or pin 35 adapted to engage between any of the teeth 24 of the sprocket.

The opposite adjacent end of the wire is bent at a substantially right angle to the arm 34, as at 36, and connected integrally by a cross bar 37, engaged with a similar member 36' carried on a stud fixed in a corresponding bracket on the other side bar.

These elements 36, 36', and 37 constitute a strut or stop device for preventing the cart from being overturned by tilting rearwardly, as best seen in Figure 1.

The rod 36 may preferably have a flattened spot 38, containing an opening in which is engaged one end of a chain 40, passing upwardly through an eyelet 41 set in the underside of the reach 15 into which the chain enters and extends to a similar eyelet 41', thence outwardly to engage the lower end of an arcuately curved lever 42, pivoted at 43 on a bracket 44 fixed at the uppermost portion of the reach, as shown in Figures 1 and 4.

The lever 42 is curved downwardly in conformity with the under side of the reach and is connected by a concave release bar 45 at its end with a similar, shorter lever 46 pivoted to a bracket 47, corresponding to the pivot carrying bracket 44, carried on the reach.

The cross sectional convexity of the release bar 45 is suited to the handle bar, so as to form engagement therewith when raised by an operator.

Obviously an attendant upon placing one or both hands on the handle bar, the fingers can make simultaneous contact with the release bar 45, drawing it upwardly and moving the lever correspondingly, such action drawing the chain through the eyelet, thereby raising the support strut rod 36 clearly off the ground and coincidently releasing the detent 35 from its engagement between any two adjacent teeth of the sprocket 24.

Upon removing the fingers from the handle bar the release bar 45 will drop instantly into the position shown in Figure 2, the same being caused by gravity, due to the weight of the strut elements as indicated.

In the modified form, shown in Figure 7, the strut elements 50 are pivoted on brackets 51 carried by the side bars 15, but in this case the pivotal point 52 is above the center of the bar; these elements are integral with an arm 53, having a detent pin 54 to engage between the teeth of the sprockets, but above its center in place of below, the connection of the chain 40 being such as to raise the detent and simultaneously move the strut 50 forwardly, in place of rearwardly, as in the previously described device.

Another modification, shown in Figure 8, is substantially the same as that first described, but in place of a strut being used, a short rod 55 is formed on the detent arm 56, the chain 40 connecting with the rod at a point near its pivot, between it and a counterweight 57, whereby the chain is stressed to the extent of maintaining the release bar 45 in its normally lowered position.

The advantages of having the release bar 45 below, rather than above the handle bar, are many: one of which is in lessening the liability of accidental or mischievous release of the stop device, such for instance, as by placing garments temporarily on the handle bar, or the inadvertent application of pressure, and also in the ease with which the release bar may be held upwardly.

Obviously, the moment the hand is removed from the release bar the stopping effect instantaneously takes place and the strut is dropped into a substantially vertical, operative position by gravity, no springs being used.

In the further modification, shown in Figure 9, the reach 16 has secured to it a double ended bracket 60 having upper and lower openings, either of which may carry a pivot 61 to act as the fulcrum of a lever strut 62, in this case bent, as at 63, to provide a clearance when the strut is swung forwardly into an inoperative position, adjacent the axle 12, between the wheels.

The upper end 64 of the lever is curved to form a detent 65 engageable between the teeth of the sprocket 22 and may be provided with a compensating counterbalance 66, nearly equivalent to the weight of the strut 62, to reduce the pressure exerted on the release bar 45 when the cart is in operation.

It is to be noted that the so called sprocket 22 is in reality not a sprocket which could be used in connection with a chain, as the teeth are excessively elongated the better to receive the detents, which enter from the periphery, radially and not laterally, upon release of the bar 45 and consequent slackening of the chain 40.

It will be understood that if the stop and strut device be built into the vehicle the stops may be arranged with reference to any of the wheels, and that the parts may be modified from those herein described, but without departing from the spirit and scope of the invention in its broadest aspect.

Having thus described the invention, what is claimed as new and desired to secure by Letters Patent, is:—

1. A safety device for push carts having a handle bar, comprising a toothed disc fixed on one of the cart wheels, a pivoted detent engageable with the teeth of said disc, a compensating strut rearward of the cart wheels to contact the ground surface during engagement of said detent, said strut being integral therewith and movable by gravity, a release bar pivoted to swing upwardly against said handle bar and away therefrom, and means actuated by raising said release bar to move said detent out of engagement with said disc and raise said strut from the ground surface.

2. A safety device for push carts having a handle bar, comprising a pivoted lever having a detent on one of its arms, keeper means carried by a wheel of said cart to receive said detent, a compensating U shaped strut formed by the other end of said lever to contact the ground surface rearwardly of and between the rear wheels of the cart when said detent is engaged with the keeper means, said detent and compensating strut operating by gravity, a release bar spaced parallel and below said handle bar to be raised by the fingers of an operator, and means actuated by raising said release bar simultaneously with the grasping of the handle bar to move said lever whereby said detent and strut are rendered inoperative.

3. A safety device for push carts having a handle bar, comprising a pivoted lever having a detent at one end and a support strut at the other, means on a wheel of the cart to receive said detent when said strut is in an operative position, said lever being gravity actuated, a release bar pivoted to swing in a path below said handle bar, and a flexible connection controlled by the movement of said release bar to retract said detent and strut simultaneously upon raising said release bar.

4. In an automatic safety device for push carts, the combination with wheel locking means and a non-tilt back stop incorporated therewith, said elements being gravity operated, of a release bar extending below the handle bar of the cart throughout its full length adapted to be grasped simultaneously with the handle bar of the cart by the fingers of an operator for coincidently releasing the wheel locking means and moving the back stop into an inoperative position.

5. In an automatic safety device for push carts, the combination with a rear wheel thereof, of a disc secured axially to said wheel, a series of elongated radial teeth on said disc, a detent pivoted to swing into engagement with said teeth, a compensating, non-tilt strut integral with said detent whereby it is normally held in an operative position, said strut normally extending pendantly downward and adapted to swing between the rear wheels of the cart when raised, a release bar having lever arms pivoted to the reach rods of the cart to swing upwardly against the push bar of the cart, and operative connections between said lever arms and said detent.

6. In an automatic safety device for push carts, the combination with a rear wheel thereof, of a disc having a series of elongated radial teeth projecting from its periphery, means for rigidly securing said discs axially to said wheel, brackets fixed on the side bars of the cart, a lever pivoted in one of said brackets, one of the arms of said lever constituting a strut having a part pivoted in the other of said brackets and another part to contact the ground when in one position and to swing upwardly between the rear wheels when in another position, a detent carried by the other arm of said lever adapted to radially engage the teeth of said disc when said strut is in position to contact the ground and to clear said teeth when the strut is swung upwardly, a release bar pivoted to swing parallel and below the push bar of the cart, and a flexible connection between said release bar and said lever whereby the strut and detent are actuated by the movement of said release bar.

In testimony whereof I affix my signature.

RAPHAEL C. GALLINANT.